Patented Feb. 9, 1937

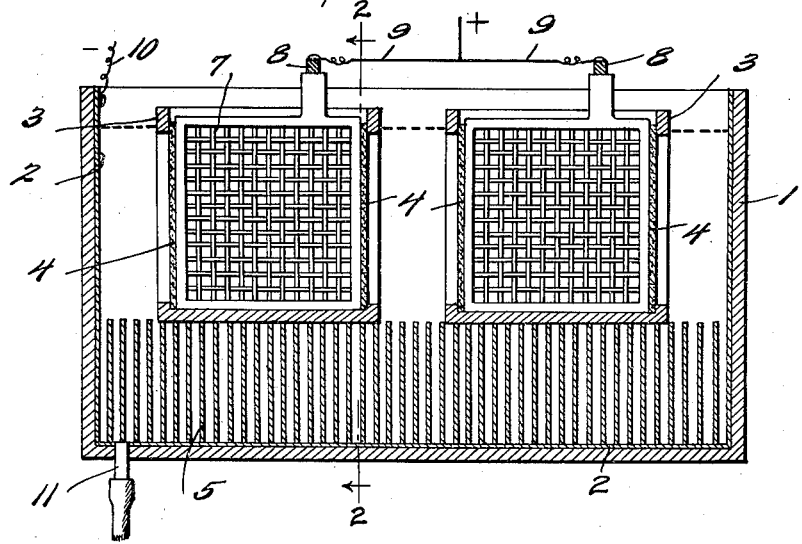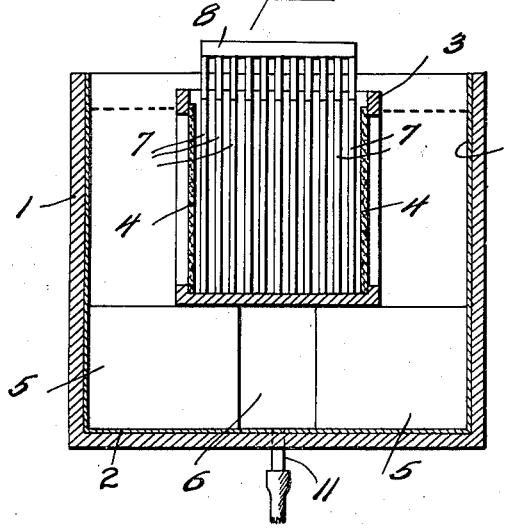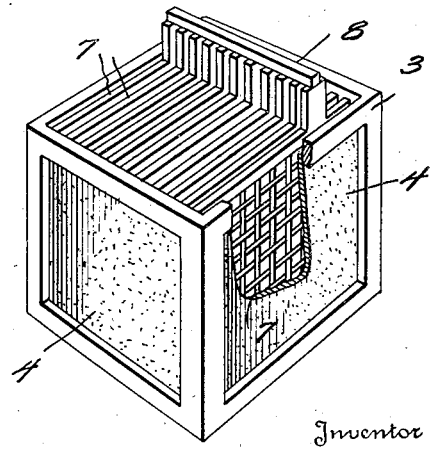

2,070,513

UNITED STATES PATENT OFFICE 2,070,513

APPARATUS FOR ELECTROLYTIC PRODUCTION OF LEAD AND OXIDES OF LEAD

Edmund Olin Cummings, High Point, N. C.

Application September 22, 1934, Serial No. 745,034

12 Claims. (Cl. 204—61)

This invention relates to process and apparatus for electrolytic production of lead and oxides of lead, and has particular reference to the recovery of lead, lead oxide and lead peroxide from junk battery plates.

Among the objects of this invention is the production of oxides of lead from the crumbly and friable material of junk battery plates, at the anode of a multiple-compartment cell. A further object of this invention comprises the production of spongy lead from the crumbly and friable material of junk battery plates, at the cathode of a multiple-compartment cell. A still further object of this invention comprises the simultaneous electrolytic production of the oxides of lead at the anode and spongy lead at the cathode of a multiple-compartment cell from the crumbly, friable material of junk battery plates, and the simultaneous production of sulphuric acid from the sulphated portion of this friable material.

Other, further, and more specific objects of this invention will become readily apparent to persons skilled in the art from a consideration of the following description when taken in conjunction with the accompanying drawing wherein:

Fig. 1 is a vertical cross-section through a multiple-compartment cell employed in carrying out my process.

Fig. 2 is a cross-section along line 2—2 of Fig. 1.

Fig. 3 is a perspective view of an anode compartment of the multiple-compartment cell, a portion being broken away to illustrate the interior.

The apparatus comprises the box 1 having the lead lining 2. Within this box are disposed one or more smaller boxes 3 which form the anode compartments. Each of these boxes 3 is provided with porous, diaphragm material 4 of wood, perforated rubber, asbestos, or other porous material which is not affected by the dilute acid employed as the electrolyte in my process. The walls of the box 3 are provided with suitable openings to permit passage of the electrolyte to the porous diaphragm 4. The boxes 1 and 3 may be of hard rubber, asphaltic or bituminous composition or other suitable material.

In my preferred process, I place the lead plates 5 edgewise upon the lead lining at the bottom of the box 1. These plates 5 may be foraminous or non-foraminous and may also take the form of grids. I prefer to use for this purpose the scrap or junk battery plates, the negative scrap plates usually being more satisfactory than the positive scrap plates. The plates 5 are closely spaced and may be arranged in any convenient manner to utilize the inner lead-lined floor space of the box 1. I have found it convenient to arrange these plates 5 in two rows extending from end to end and having a central space 6 for free movement of the electrolyte. The boxes 3 may rest upon the top of the plates 5, or otherwise supported if desired.

Inside of these boxes 3 are placed lead grids 7. These grids are also closely spaced and preferably extend from one end or side of the box to the opposite end or side and practically reach from the bottom to near the top of the boxes 3. The grids 7 in each box are electrically connected by a conductor 8 and from this conductor the leads 9 extend to the positive pole of a direct-current generator. The lead lining 2 which serves as a cathode is also connected by one or more leads 10 to the negative pole of the generator.

In my preferred process, the friable and crumbly brown material which has been removed from the positive plates of junk batteries, either by the use of a pebble mill, ball mill, roller mill or combinations of these mills together with suitable screens and consisting chiefly of $PbO_2$, $PbO$, $Pb_2O$ and $PbSO_4$ is placed in the anode compartments 3 and this powdered material fills the spaces in and between the grids 7 in these anode cells. As these grids are closely spaced to each other, the layers of friable positive plate material are thin, thus affording a large area of contact per unit volume between this material and the grids 7, and thereby effecting a high efficiency in the utilization of the electric current during the electrolysis.

Dilute sulphuric acid, or an aqueous solution of a salt, such as sodium sulphate, is added until the powdery material in the cells 3 is covered with the solution. I have found it advantageous to allow this made-up cell to stand for at least 12 hours before starting the current to flow. This allows any lead oxide present to react with sulphuric acid from the electrolyte, thereby properly conditioning the material for the subsequent reduction or oxidation, as the case may be. The powder also becomes thoroughly soaked with the solution, and the voltage required to force the current through the cell is much less after the mass has been allowed to stand for such time. Ordinarily a cell of this kind requires about 2.2 to 2.5 volts. When a number of the cells 1 are employed, they may be connected in series, depending upon the voltage available.

After standing for such length of time the current is allowed to pass through the cell. The current density may vary over a wide range. I have found the best condition to be one in which enough current is used to give rapid reduction and oxidation, but not enough to cause excessive liberation of gases.

As the oxidation and reduction progresses, the specific gravity of the solution becomes greater due to the fact that lead sulphate in the negative plate scrap 5 is being converted into lead and sulphuric acid, while the lead sulphate in the brown powder at the anode is being converted into lead peroxide and sulphuric acid.

The reduction and oxidation is complete when there is no further rise in the specific gravity of the electrolyte which indicates that there is no increase in its sulphuric acid content.

After the electrolysis is complete, the electrolyte solution is allowed to pass into a suitable reservoir, not shown, by means of a rubber hose connected to the drain pipe 11. This acid is considerably stronger than the dilute acid introduced at the beginning of the process. Part of this acid may be diluted and used in subsequent electrolysis, while a large part of the acid is available for other purposes.

The lead peroxide is removed from cells 3 immediately after the electrolyte is drained from the box 1 and the entire washing of the lead peroxide is performed outside of the cells 3. If desired, a filter-press may be employed in connection with the washing and removal of the liquid from the lead peroxide.

Alternatively, the box 1 may be filled with water and allowed to drain, this washing being repeated a number of times until the wash-water is free from acid. The boxes 3, which now contain the lead peroxide are then withdrawn, the lead peroxide is removed as a sludge by a stream of water, and allowed to drain and dry.

The reduced negative plate scrap remaining at the bottom of the lead-lined box 1 is in the form of spongy lead and is allowed to rapidly drain free from the water, is placed in a melted pot, and melted out of contact with air. This causes the minimum amount of lead dross to be formed.

The melted lead may then be cast into pigs and used for any purpose that medium hard lead is suitable; for example, in the battery industry.

In case soft lead is desired, the molten lead, obtained as above, may be run into a furnace and before much of the lead oxidizes the antimony which is normally present will be practically entirely oxidized and may be removed by skimming, leaving soft lead behind. The dross obtained from this melting pot may be added to the negative plate scrap in the cells for the next electrolytic run, and may be converted into antimony and lead at the same time that the scrap plates are being converted into lead.

Instead of converting into metallic lead, the spongy lead at the bottom of the lead-lined box 1, may be slowly heated in free contact with air whereby it is readily oxidized into lead oxide. This lead oxide may then be placed in the anode cell either with or without the brown powdery material obtained from the positive plates of the batteries and electrolytically converted into lead peroxide.

A further variation of my process consists in taking the friable and crumbly gray material from the negative scrap plates and placing this material at the bottom of the lead-lined vessel 1 and converting this material into spongy lead. While this treatment of the gray material is taking place, negative scrap plates may or may not be present, as desired. If the gray material is electrolyzed alone and there is no negative plate scrap upon the bottom of the lead-lined chamber 1, the spongy lead formed will be much purer and practically free from antimony, thus yielding very soft lead. This may be attributed to the fact that the antimony which causes the hardness of the lead is in the grid of the plate and not in the friable crumbly material of the plate.

If there are no scrap plates present during the treatment of the gray powdery material of the negative scrap plates, lead plates or grids made from pure soft lead are usually placed on the bottom of the lead-lined box similar to the way the negative plate scrap is otherwise placed, and the finely-ground gray powder is poured in, with shaking, until the grids are covered. The process is then carried out as before. If desired, the fine gray powder from the negative plates may be poured on the bottom of the lead-lined box without use of the lead grids and then treated to produce spongy lead. The disadvantage of electrolyzing without the lead plates or grids is that a higher initial voltage is required than when lead grids are used.

My new process and apparatus have been found very efficient and economical for preparing spongy lead, hard lead, pure soft lead and the oxides of lead, particularly lead peroxide and lead oxide. My process is more efficient when the gray friable material is treated at the cathode, and when waste battery plates are used at the cathode the negative plates are preferred rather than the positive plates. Also, in electrolysis at the anode it is more efficient to treat the brown, friable material from positive junk battery plates, rather than the powder obtained from the negative plates. The lead at the anode gradually becomes converted into lead peroxide by the electrolysis and adds to the yield of lead peroxide.

For purposes of economy and more effective use of the electric current, it is desirable to have electrolysis take place simultaneously at both anode and cathode. However, my invention is adapted for treatment of the crumbly, friable material of junk battery plates either at the anode alone or at the cathode alone.

Whereas in prior methods of treating junk battery plates, $SO_2$ and $SO_3$ gases were evolved during the smelting and created a nuisance in the neighborhood of the smelter by impairing vegetation and other objects, in my process there is no evolution of $SO_2$ and $SO_3$, but sulphuric acid is recovered as a valuable by-product. Also, by pouring the brown powder from the positive plates into the boxes containing the lead grids, intimate contact of the powder with the lead electrode is obtained with a minimum amount of labor. The conductor 8 makes electrical contact with the plates or grids in the anode compartment while the lead lining 2 makes electrical contact with the plates or grids in the cathode compartment, thereby dispensing with separate leads to each of the plates or grids.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In an apparatus for electrolytic production of lead and oxides of lead, a cathode compartment containing lead lining, an anode compartment separated from the cathode compartment by porous diaphragm material, a plurality of closely-spaced, foraminous plates within said anode compartment and electrically connected to the positive pole of an electric source of power, friable and crumbly material from waste battery plates and in powder form disposed between said foraminous plates, a plurality of closely-spaced, waste battery plates within said cathode compartment and bearing edgewise against said lead lining, and electrical connection from said lead lining to the negative pole of an electric source of power.

2. In an apparatus for electrolytic production of lead and oxides of lead, a cathode compartment containing a bottom lead lining, an anode compartment separated from the cathode compartment by porous diaphragm material, a plurality of closely-spaced, foraminous plates within said anode compartment and electrically connected to the positive pole of an electric source of power, friable and crumbly material from waste battery plates and in powder form disposed between said foraminous plates, a plurality of closely-spaced, waste battery plates within said cathode compartment and resting edgewise upon said lead lining, and electrical connection from said lead lining to the negative pole of an electric source of power.

3. In an apparatus for electrolytic production of lead and oxides of lead, a vessel having a metal lining, a foraminous body comprising used battery plate material, said body being in detachable, direct contact with the metallic lining of the vessel and serving as an electrode in the electrolytic cell, electrical connection from said metal lining to a pole of an electric source of power, a support within said vessel, and battery plate material on said support and electrically connected in detachable relation to the opposite pole of an electric source of power.

4. In an apparatus for electrolytic production of lead and oxides of lead, a vessel having a metal lining, a foraminous body comprising used battery plates and friable and crumbly material from waste battery plates, said body being in detachable, direct contact with the metallic lining of the vessel and serving as an electrode in the electrolytic cell, electrical connection from said metal lining to a pole of an electric source of power, a support within said vessel, battery plate material on said support and electrically connected in detachable relation to the opposite pole of an electric source of power, and an electrolyte comprising a dilute solution of material forming $SO_4$ ions.

5. In an apparatus for electrolytic production of lead and oxides of lead, a vessel having a metal lining, a plurality of closely spaced battery plates within said vessel and bearing edgewise in detachable relation against said metal lining, electrical connection from said metal lining to a pole of an electric source of power, a support within said vessel, and a plurality of closely spaced plates on said support and electrically connected in detachable relation to the opposite pole of an electric source of power.

6. In an apparatus for electrolytic production of lead and oxides of lead, a vessel having a metal lining, a plurality of closely spaced battery plates within said vessel and bearing edgewise in detachable relation against said metal lining, electrical connection from said metal lining to the negative pole of an electric source of power, a support within said vessel, and a plurality of closely spaced plates on said support and electrically connected in detachable relation to the positive pole of an electric source of power.

7. In an apparatus for electrolytic production of lead and oxides of lead, a vessel having a lead lining, a plurality of closely spaced battery plates within said vessel and bearing edgewise in detachable relation against said lead lining, friable and crumbly material from waste battery plates and in powder form disposed between said battery plates, electrical connection from said lead lining to the negative pole of an electric source of power, a support within said vessel, a plurality of closely spaced foraminous plates on said support and electrically connected in detachable relation to the positive pole of an electric source of power, and an electrolyte comprising a dilute solution of material forming $SO_4$ ions.

8. In an apparatus for electrolytic production of lead and oxides of lead, a vessel having a metal lining, a foraminous body comprising used battery plate material, said body being in detachable, direct contact with the metallic lining of the vessel and serving as an electrode in the electrolytic cell, electrical connection from said metal lining to a pole of an electric source of power, a container within said vessel and having sufficient opening to afford electric conductivity between the electrolyte in the container and that in the vessel and to permit transfer of ions from the container to said vessel, and battery plate material in said container and electrically connected in detachable relation to the opposite pole of an electric source of power.

9. In an apparatus for electrolytic production of lead and oxides of lead, a vessel having a metal lining, a foraminous body comprising used battery plates and friable and crumbly material from waste battery plates, said body being in detachable, direct contact with the metallic lining of the vessel and serving as an electrode in the electrolytic cell, electrical connection from said metal lining to a pole of an electric source of power, a container within said vessel and having sufficient opening to afford electric conductivity between the electrolyte in the container and that in the vessel and to permit transfer of ions from the container to said vessel, battery plate material in said container and electrically connected in detachable relation to the opposite pole of an electric source of power, and an electrolyte comprising a dilute solution of material forming $SO_4$ ions.

10. In an apparatus for electrolytic production of lead and oxides of lead, a vessel for holding the electrolyte, an electrically conductive support within said vessel and electrically connected to a pole of an electric source of power, and battery plate material on said support in detachable relation thereto.

11. In an apparatus for electrolytic production of lead and oxides of lead, a vessel for holding the electrolyte, a foraminous body comprising used battery plate material and serving as an electrode in the electrolytic cell, electrical connection from said foraminous body to a pole of an electric source of power, an electrically conductive support within said vessel and electrically connected to the opposite pole of an electric source of power, and battery plate material on said support in detachable relation thereto.

12. In an apparatus for electrolytic production of lead and oxides of lead, a vessel for holding the electrolyte, a foraminous body comprising used battery plates and friable and crumbly material from waste battery plates and serving as an electrode in the electrolytic cell, electrical connection from said foraminous body to a pole of an electric source of power, an electrically conductive support within said vessel and electrically connected to the opposite pole of an electric source of power, battery plate material on said support in detachable relation thereto, and an electrolyte comprising a dilute solution of material forming $SO_4$ ions.

EDMUND OLIN CUMMINGS.